United States Patent  (10) Patent No.: US 11,635,766 B2
Huang  (45) Date of Patent: Apr. 25, 2023

(54) METHOD FOR DOCKING AND AUTOMATICALLY CHARGING ROBOT, CHARGING STATION AND ROBOT

(71) Applicant: SHENZHEN SILVER STAR INTELLIGENT TECHNOLOGY CO., LTD, Guangdong (CN)

(72) Inventor: Fujun Huang, Guangdong (CN)

(73) Assignee: SHENZHEN SILVER STAR INTELLIGENT GROUP CO., LTD., Shenzhen (CN)

( * ) Notice: Subject to any disclaimer, the term of this patent is extended or adjusted under 35 U.S.C. 154(b) by 1022 days.

(21) Appl. No.: 16/370,228

(22) Filed: Mar. 29, 2019

(65) Prior Publication Data

US 2020/0150676 A1    May 14, 2020

(30) Foreign Application Priority Data

Nov. 9, 2018 (CN) .......................... 201811329974.9

(51) Int. Cl.
    *G05D 1/02*      (2020.01)
    *H02J 7/00*      (2006.01)
    (Continued)

(52) U.S. Cl.
    CPC ............ *G05D 1/0225* (2013.01); *B60L 53/35* (2019.02); *B60L 53/36* (2019.02); *B60L 53/37* (2019.02);
    (Continued)

(58) Field of Classification Search
    CPC ............... G05D 1/0225; G05D 1/0236; G05D 1/0221; G05D 1/0223; G05D 1/024;
    (Continued)

(56) References Cited

U.S. PATENT DOCUMENTS

| 2009/0228165 A1* | 9/2009 | Ozick | G05D 1/0225 320/137 |
| 2012/0197464 A1* | 8/2012 | Wang | G05D 1/0038 701/28 |
| 2015/0115876 A1* | 4/2015 | Noh | H02J 7/0042 320/107 |
| 2017/0177001 A1* | 6/2017 | Cao | B60L 53/36 |
| 2018/0246518 A1* | 8/2018 | Vogel | G05D 1/0234 |
| 2018/0249872 A1* | 9/2018 | Park | G06V 20/64 |

(Continued)

FOREIGN PATENT DOCUMENTS

| CN | 104977929 A | * 10/2015 | ........... A47L 9/2852 |
| CN | 105629971 | 6/2016 | |

(Continued)

*Primary Examiner* — Richard Isla
*Assistant Examiner* — Manuel Hernandez
(74) *Attorney, Agent, or Firm* — Yu Gang (57) ABSTRACT

Embodiments of the present application relate to the field of robots, and disclose a method and a device for automatically charging a robot, a charging station and a robot. The method for automatically charging a robot in the present application, applied to the robot, includes the steps of: detecting a distance to a charging station according to a laser ranging signal; starting laser feature recognition when the distance is determined less than a preset distance, where the laser feature recognition is configured to identify the charging station; and performing docking process according to a recognition result of the laser feature recognition, a laser ranging signal and an infrared guiding signal. The method for automatically charging a robot in the embodiments enables the intelligent robot to quickly and accurately find the charging station, and accurately perform the docking process and automatically charging.

15 Claims, 7 Drawing Sheets

(51) Int. Cl.
*B60L 53/35* (2019.01)
*B60L 53/36* (2019.01)
*B60L 53/37* (2019.01)

(52) U.S. Cl.
CPC .......... *G05D 1/0236* (2013.01); *H02J 7/0044* (2013.01)

(58) Field of Classification Search
CPC ............... G05D 1/0242; G05D 1/0257; G05D 1/0276; H02J 7/0044; H02J 7/025; H02J 7/0027; B60L 53/36; B60L 53/35; B60L 53/37
USPC .......................................... 700/245; 320/109
See application file for complete search history.

(56) References Cited

U.S. PATENT DOCUMENTS

| | | | | |
|---|---|---|---|---|
| 2018/0292837 A1* | 10/2018 | Chen | .................. | G05D 1/024 |
| 2020/0022552 A1* | 1/2020 | Han | .................. | A47L 9/2889 |
| 2021/0349470 A1* | 11/2021 | McDaniel | .......... | G05B 13/0265 |

FOREIGN PATENT DOCUMENTS

| CN | 106026288 | | | 10/2016 | | |
|---|---|---|---|---|---|---|
| CN | 106980320 | | | 7/2017 | | |
| CN | 107193282 | | | 9/2017 | | |
| CN | 108733048 | A | * | 11/2018 | ........... | G05D 1/0242 |
| CN | 109002043 | A | * | 12/2018 | ........... | G05D 1/0225 |
| CN | 112214015 | A | * | 1/2021 | | |
| KR | 20160048347 | A | * | 5/2016 | .............. | A47L 11/24 |
| KR | 20180094300 | | | 8/2018 | | |
| WO | WO-2020140809 | A1 | * | 7/2020 | .............. | A47L 11/24 |

\* cited by examiner

METHOD FOR DOCKING AND AUTOMATICALLY CHARGING ROBOT, CHARGING STATION AND ROBOT

TECHNICAL FIELD

Embodiments of the present application relate to the field of robots, and in particular to a method and a device for automatically charging a robot, a charging station and a robot.

BACKGROUND

With the continuous development of technologies, the existing intelligent robot are more and more widely used, such as a cleaning robot, a banking service robot etc. When detecting the need for charging, the current intelligent robot will automatically return to a charging station for charging. For example, the cleaning robot can perform cleaning work indoors autonomously, and automatically return to the charging station for charging when its own power reaches a lower limit of charging.

The inventors have found at least following problem existed in the prior art: at present, the function of the robot for automatically returning to the charging station for charging is achieved by using a laser sensor in combination with an infrared sensor. That is, the robot, when at a long distance, follows infrared guiding signal of the charging station to reach a position near the charging station by using the infrared sensor, and the position of the robot, when at a close distance, is adjusted by laser ranging, so that the robot can move to an exact docking position, and dock with the charging station at the docking position. Moreover, the position will be adjusted by collision during the docking process, so as to reduce the times of collision, thus achieving the function of the intelligent robot for automatically recharging. However, in the process that the intelligent robot returns to the charging station by adopting this manner, the robot can still receive the infrared guiding signal through a hollow position if there is a hollow obstacle, thereby causing the robot to fail to identify the obstacle and have collision with the obstacle, and slowing down the speed at which the intelligent robot finds the charging station. When docked at a close distance, if the charging station is close to the position of other obstacles, the charging station can be detected only by continuous collision, which reduces identification efficiency of the charging station, and increases probability of damaging the robot. In addition, when at a long distance, the search for the charging station is realized only by the infrared sensor, resulting in a slow speed for searching the charging station and a slow docking of the intelligent robot.

It can be seen that, in the process that the intelligent robot returns to the charging station, how to improve the accuracy of the intelligent robot to identify the charging station and quickly complete docking are problems to be solved.

SUMMARY

A purpose of embodiments of the present application is to provide a method and a device for automatically charging a robot, a charging station and a robot, such that the intelligent robot can quickly and accurately find the charging station, and accurately perform the docking process and automatically charging.

In order to solve the above technical problems, the embodiments of the present application provide a method for automatically charging a robot, which is applied to the robot, and includes the steps of: detecting a distance to a charging station according to a laser ranging signal; starting laser feature recognition when the distance is determined less than a preset distance, where the laser feature recognition is configured to identify the charging station; and performing docking process according to a recognition result of the laser feature recognition, a laser ranging signal and an infrared guiding signal.

The embodiments of the present application also provide a device for automatically charging a robot, which includes: a laser ranging module, a laser feature recognition module and an docking module; where, the laser ranging module is configured to detect a distance to a charging station according to a laser ranging signal; the laser feature recognition module is configured to start laser feature recognition when the distance is determined less than a preset distance, where the laser feature recognition is configured to identify the charging station; and the docking module is configured to perform docking process according to a recognition result of the laser feature recognition, the laser ranging signal and an infrared guiding signal.

The embodiments of the present application also provide a charging station, which includes: a main body; and a laser-recognizable feature part, a component for emitting an infrared guiding signal and a charging interface arranged on the main body; where, the laser-recognizable feature part is configured to be recognized by a mode of laser feature recognition started by a robot; the component for emitting an infrared guiding signal is configured to emit an infrared guidance signal to be received by the robot; and the charging interface is configured to charge the robot after the robot performs a docking process, where the robot performs the docking process according to a recognition result of the laser feature recognition, a laser ranging signal and the infrared guiding signal.

The embodiments of the present application also provide a robot, which includes: a sensing device; at least one processor; and a memory in communication connection with the at least one processor; where, the sensing device is configured to emit signals or receive signals under a control of the processor; and the memory is stored with instructions executable by the at least one processor, and the instructions, when executed by the at least one processor, enable the at least one processor to perform the above method for automatically charging a robot.

Compared with the prior art, the embodiments of the present application start the laser feature recognition under the condition that the distance to the charging station is determined less than the preset distance, and identify the charging station in the manner of the laser feature recognition, and then guide the robot to perform the docking process by combining the laser ranging signal and the infrared guiding signal, which enables the robot to accurately recognize the charging station due to the combination of various methods for identifying the charging station, and enables the robot to move to the identified charging station to perform the docking process. If there is a hollow obstacle, through the recognition method for the laser feature recognition, the robot can effectively avoid the collision due to that the robot misidentifies the charging station, which accelerates the speed of the robot to dock; at the same time, the robot, when at a close the distance to the charging station, compensates the blind area of the infrared guiding signal through combination of the laser ranging signal and the infrared guiding signal. Further, when the obstacle (such as a wall) and the charging station are adjacent to each other, the robot avoids the problem of being fail to dock caused by its misidentification of the charging station through combination with the laser feature recognition. Therefore, the identification accuracy for the charging station is improved, which further speeds up the speed of the robot to dock.

Additionally, the step of starting laser feature recognition when the distance is determined less than a preset distance specifically includes the steps of: detecting whether a collision has occurred when the distance is determined less than the preset distance; starting the laser feature recognition if it is determined that there is no collision, and performing the laser feature recognition in a direction where the infrared guiding signal is emitted; and starting the laser feature recognition if it is determined that there is a collision, and performing the laser feature recognition on a collision object. According to the recognition result of the collision, different laser feature recognition solutions are determined, and the recognition speed for the charging station or the obstacle can be accelerated by the different laser feature recognition solutions.

Additionally, the step of performing docking process according to a recognition result of the laser feature recognition, a laser ranging signal and an infrared guiding signal specifically includes the steps of: acquiring the recognition result of performing the laser feature recognition on the collision object when there is a collision; outputting an error message, if the collision object is determined to be the charging station according to the recognition result and if a current collision frequency exceeds a preset collision frequency; performing the docking process by following the infrared guiding signal, if the collision object is determined to be the charging station according to the recognition result and if the current collision frequency does not exceed the preset collision frequency; determining a motion path according to position information of the charging station, reaching the position of the charging station according to the motion path, and performing the docking process by following the infrared guiding signal, if the collision object is determined to be an obstacle according to the recognition result and if it is detected that the robot is stored with the position information of the charging station; and performing the docking process by following the infrared guiding signal when it is determined that the obstacle has been circumvented or outputting an error message when it is determined that the obstacle has not been circumvented, if the collision object is determined to be an obstacle according to the recognition result and if it is detected that the robot is not stored with the position information of the charging station. When there is a collision, different docking strategies are determined by the recognition result of the laser feature recognition in combination with the laser ranging signal and the infrared guiding signal, and different docking strategies are adopted for different results to improve the speed of docking.

Additionally, the step of performing docking process according to a recognition result of the laser feature recognition, a laser ranging signal and an infrared guiding signal specifically includes the steps of: acquiring the recognition result of performing the laser feature recognition in a direction where the infrared guiding signal is emitted when there is no collision; circumventing the obstacle and performing the docking process by following the infrared guiding signal if an obstacle is detected in the direction where the infrared guiding signal is emitted according to the recognition result; detecting the distance between the current position and the charging station if the charging station is detected in the direction where the infrared guiding signal is emitted according to the recognition result; determining a docking position according to the currently determined distance, and moving to the docking position; and performing docking by following the infrared identification signal at the docking position. When there is no collision, if it is determined that an obstacle appears in the direction where the infrared guiding signal is emitted, there is no need to reconfirm by collision, which reduces the probability of collision of the robot.

Additionally, before the step of detecting a distance to a charging station according to a laser ranging signal, the method further includes the steps of: receiving the infrared guiding signal; pre-processing the infrared guiding signal, and determining the direction where the infrared guiding signal is emitted; and adjusting a motion direction of the robot according to the determined direction where the infrared guiding signal is emitted. By adjusting the motion direction of the robot, the robot is able to move toward the position of the charging station, thereby the position of the charging station can be quickly determined.

Additionally, the step of detecting a distance to a charging station according to a laser ranging signal specifically includes the steps of: emitting the laser ranging signal in the direction where the infrared guiding signal is emitted; and detecting the distance to the charging station according to the laser ranging signal. That emitting the laser ranging signal in the direction where the infrared guiding signal is emitted increases the probability of detecting the charging station.

DESCRIPTION OF THE DRAWINGS

One or more embodiments are exemplified with reference to corresponding figures in the accompanying drawings, and the exemplary description does not constitute limitation of the embodiments. Elements with the same reference numerals in the drawings are represented as similar elements unless otherwise stated, and the figures in the accompanying drawings do not constitute a scale limitation.

DETAILED DESCRIPTION OF EMBODIMENTS

In order to make the purposes, technical solutions and advantages of the embodiments of the present application clearer, the embodiments of the present application will be described in detail below with reference to the accompanying drawings. However, it will be apparent to those skilled in the art that, in the various embodiments of the present application, many technical details are set forth in order to provide readers with a better understanding of the present application. Whereas the technical solutions claimed in the present application can also be implemented without these technical details and various changes and modifications based on the following embodiments.

Figure 1:
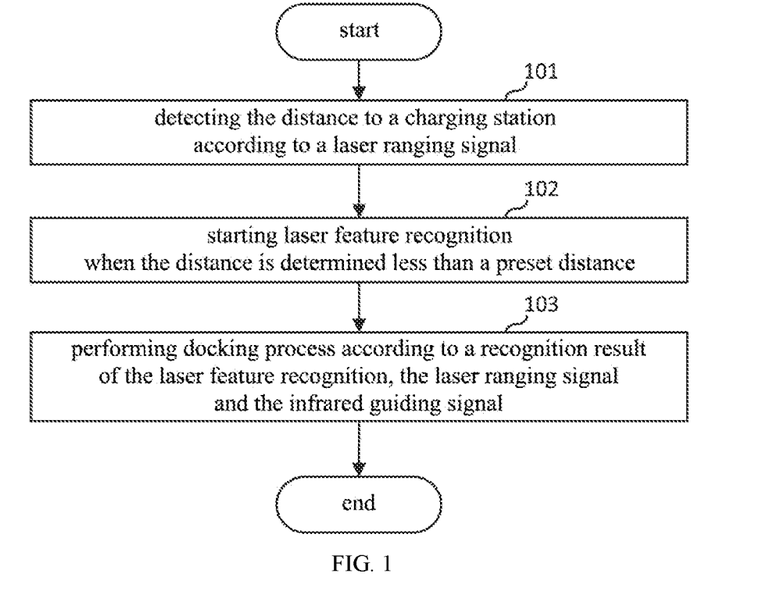
FIG. 1 is a specific schematic flowchart of the method for automatically charging a robot provided by a first embodiment according to the present application.

The first embodiment of the present application relates to a method for automatically charging a robot. The method for automatically charging a robot is applied to a robot, for example, a cleaning robot, a banking service robot, and the like. In the present embodiment, the cleaning robot is taken as an example for illustration, where the robot is provided with a laser sensing device, and a receiver for infrared guiding signals. The specific process of the method for automatically charging a robot is as shown in FIG. 1.

At the step 101: detecting the distance to a charging station according to a laser ranging signal.

Specifically, the robot may move toward the direction of the charging station according to the infrared guiding signal. At the same time, the robot can emit the laser ranging signal at a fixed time interval to detect the distance to the charging station. The robot may also emit the laser ranging signal in real time to detect the distance to the charging station in real time. For example, the laser sensing device is a radar, and the distance to the charging station may be detected in real time by scanning. That is, the laser sensing device may acquire 360 pieces of data when rotating one circle (one circle is 360 degrees), and one degree corresponds to one piece of data, where the data includes three kinds of information: an angle, a distance, and laser intensity. The angle is an angle of an object detected by the laser relative to the robot, the laser intensity is intensity information of a laser signal irradiating the object, and the distance between the robot and the charging station is acquired through the data acquired by the laser signal. In the present embodiment, the time of emitting the laser ranging signal is not limited, which may be set as needed in practical applications.

At the step 102: starting laser feature recognition when the distance is determined less than a preset distance, where the laser feature recognition is configured to identify the charging station.

Specifically, an identifier for the laser feature recognition is arranged on the charging station, and the robot emits a laser feature recognition signal after starting the laser feature recognition. Then the laser feature signal irradiates on the identifier for the laser feature recognition, through reflection/a geometry shape characteristic of which the robot may identify the laser feature identifier, and thereby identify the charging station provided with the identifier. Where, the preset distance may be set according to actual needs. For example, the preset distance may be determined according to the size of the robot and the moving speed. When it is determined that the distance is less than the preset distance, the function of the laser feature recognition may be directly started, that is, the laser feature recognition signal is emitted. It will be understood that, the laser sensing device of the robot may include a laser sensor and a laser emitter. The laser emitter may rotate 360 degrees with the driving of a motor, such that the robot may emit the laser feature recognition signal around it, so as to perform the laser feature recognition on the object around the robot, and further detect whether there is a charging station. Of course, the numbers of the laser sensor and the laser emitter included in the laser sensing device of the robot are not limited to the number listed above.

In another specific implementation, whether a collision occurs is detected when the distance is determined less than the preset distance. Further, the laser feature recognition is started and is performed in the direction where the infrared guiding signal is emitted if it is determined that no collision occurs; the laser feature recognition is started and is performed on a collision object if it is determined that collision occurs.

Specifically, whether the robot collides is detected when the distance is determined less than the preset distance, and the object for performing laser feature recognition is determined by collision detection. After it is determined that the collision has occurred, the laser feature recognition is perform on the collision object. If no collision occurs, then the laser feature recognition is performed in the direction where the infrared guiding signal is emitted, and it is determined whether there is obstacle toward the direction of the infrared guiding signal, so that the obstacle can be identified in advance, thereby bypassing the obstacle and avoiding unnecessary collisions.

At the step 103: performing docking process according to a recognition result of the laser feature recognition, the laser ranging signal and the infrared guiding signal.

Specifically, before the laser feature recognition is started, it is detected whether a collision has occurred. If it is determined that the collision has occurred, different docking strategies are determined under the collision. The following is a detailed description of the docking process of the robot in the event of a collision.

Figure 2:
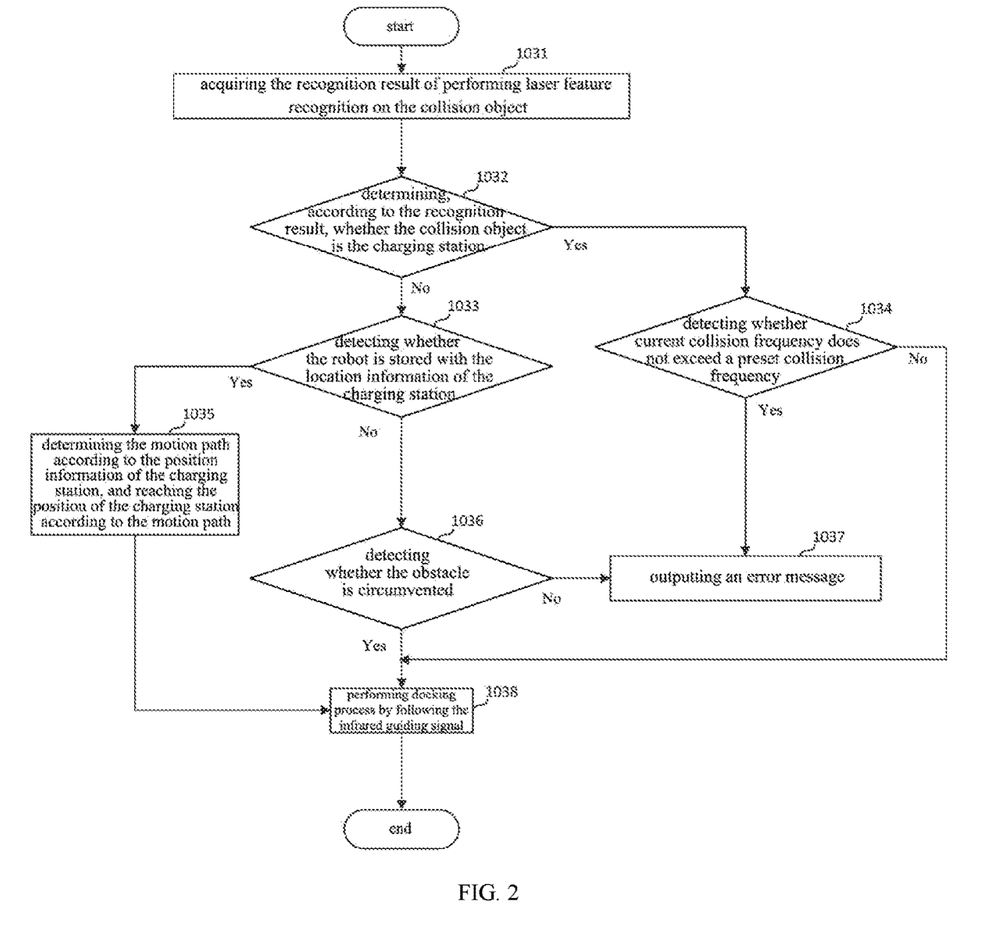
FIG. 2 is a specific schematic flowchart of the docking process of a robot with collision occurring according to the first embodiment of the present application.

In a specific implementation, in the case of a collision, the recognition result of the laser feature recognition on the collision object is acquired. If the collision object is determined to be the charging station according to the recognition result, and if the current collision frequency exceeds a preset collision frequency, then an error message is output; if the collision object is determined to be the charging station according to the recognition result, and if the current collision frequency does not exceed the preset collision frequency, then the docking process is performed following the infrared guiding signal; if the collision object is determined to be an obstacle according to the recognition result, and if it is detected that the robot is stored with position information of the charging station, then a motion path is determined according to the position information of the charging station, and the position of the charging station is reached according to the motion path reaches, further the docking process is performed following the infrared guiding signal; if the collision object is determined to be the obstacle according to the recognition result, and if it is detected that the robot is stored with no position information of the charging station, then the docking process is performed following the infrared guiding signal when it is determined that the obstacle has been circumvented, or the error message is output when it is determined that the obstacle has not been circumvented. For ease of understanding, the present embodiment is described by a specific process, which is as shown in FIG. 2.

At the step 1031: acquiring the recognition result of performing laser feature recognition on the collision object.

At the step 1032: determining, according to the recognition result, whether the collision object is the charging station, and then performing the step 1033 if the collision object is determined to be the obstacle, otherwise performing the step 1034 if the collision object is determined to be the charging station.

Specifically, the recognition result of the laser feature recognition is read, and whether the collision object is the charging station is determined according to the recognition result. For example, if the recognition result of the identifier for the laser feature recognition is A, then the recognition result B of the laser feature recognition on the collision object is compared with the stored recognition result A, and the collision object is determined to be the charging station if similarity exceeds a preset threshold (e.g., the preset threshold is 90%), otherwise the collision object is indicated not to be the charging station if the similarity does not exceed the preset threshold.

It will be understood by those skilled in the art that, in practical applications, other ways may be used to determine whether the collision object is the charging station, which will not be enumerated here.

At the step 1033: detecting whether the robot is stored with the location information of the charging station, and then performing the step 1035 if the robot is stored with the location information of the charging station, otherwise performing the step 1036.

Specifically, the robot has a storage space, which is stored with map information established by the robot. When the robot successfully completes docking and charging, the position of the charging station may be marked in the stored map. When the robot is in the process of moving back to the charging station for charging, if the distance to the charging station is less than the preset distance and the collision object is determined to be the obstacle, it is detected whether the stored map information is marked with the position information of the charging station.

At the step 1034: detecting whether the current collision frequency does not exceed a preset collision frequency, and then performing the step 1037 if the current collision frequency exceeds the preset collision frequency, otherwise performing the step 1038.

Specifically, the preset collision frequency is set in advance, and the preset collision frequency may be set according to actual needs, for example, 2 times, 3 times, and the like. Since the collision has occurred with the charging station, it indicates that the distance between the robot and the charging station is very close. After the collision object is determined to be the charging station, it is required to perform the docking process. Through detecting the collision frequency, the robot is prevented from damage caused by continuously colliding with the charging station.

It will be understood that, after the collision occurs, the robot may determine the distance to the collision object through the laser ranging signal, and may combine the infrared guiding signal to adjust the motion posture of the robot, so as to reduce the frequency of the collision between the robot and the charging station.

It should be noted that, according to the laser ranging signal, a position which is at the front side of the charging station and at the preset the distance to the charging station may be calculated by using a mathematical triangle formula, and the robot may moves to the position for docking.

At the step 1035: determining the motion path according to the position information of the charging station, and reaching the position of the charging station according to the motion path, and then performing the step 1038.

Specifically, according to the position information of the charging station and the current position information of the robot, the motion path of the robot to the charging station is planned according to an A star map, and the specific planning process will not be repeated here.

At the step 1036: detecting whether the obstacle is circumvented, and performing the step 1038 if the obstacle is circumvented, otherwise performing the step 1037.

Specifically, whether the robot has circumvented the obstacle may be detected by a collision sensor. If the collision occurs again, indicating that the obstacle has not been circumvented, then the step 1037 is performed to output an error message, and the process is ended. If no collision has occurred, indicating that the obstacle has been circumvented, then the step 1038 is performed.

At the step 1037: outputting an error message.

Specifically, the error message may be output through a prompt tone, and the error message may also be sent to a user terminal to prompt the user to process. Of course, an error handling mechanism may be performed after outputting the error message, for example, stopping the movement of the robot. The process may be terminated after the step 1037 is executed.

At the step 1038: performing docking process by following the infrared guiding signal.

The following is a detailed description of the docking strategy of the robot without collision.

In a specific implementation, in a case where no collision occurs, the recognition result of performing laser feature recognition in a direction where the infrared guiding signal is emitted is acquired; if an obstacle is detected in the direction where the infrared guiding signal is emitted according to the recognition result, then the obstacle is circumvented and the docking process is performed by following the infrared guiding signal; if the charging station is detected in the direction where the infrared guiding signal is emitted according to the recognition result, then the distance between the current position and the charging station is detected; the docking position is determined according to the currently determined distance, and the robot moves to the docking position; and the docking is performed by following the infrared identification signal at the docking position.

Figure 3:
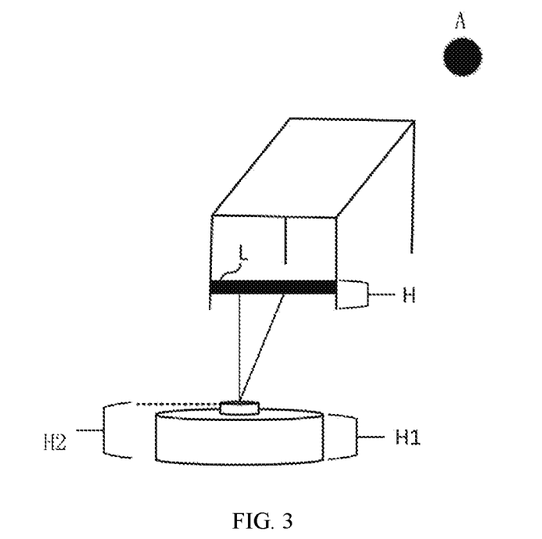
FIG. 3 is a schematic diagram of performing laser feature recognition in a direction where an infrared guiding signal is emitted without collision according to the first embodiment of the present application.
Figure 4:
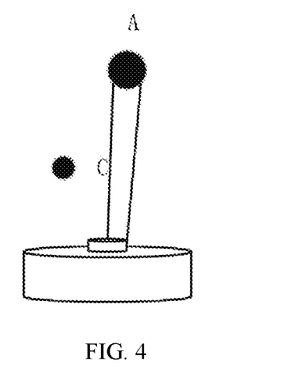
FIG. 4 is a schematic diagram showing identification of the charging station without collision according to the first embodiment of the present application.

The following is a specific example to illustrate the process. For example, as shown in FIG. 3, if the point A is the charging station, and a position at the preset distance is provided with a hollow stool, then the robot receives the infrared guiding signal emitted by the charging station, which passes through a part L of the stool as shown in FIG. 3. However, the laser feature recognition signal emitted by the robot is irradiated on the horizontal leg L between legs of the stool, the height H of the horizontal leg L is greater than the height of the main body H1 of the robot, and the height H1 is smaller than the overall height H2 of the robot, at this time, the stool is determined as an obstacle according to the recognition result because the stool is not provided with the identifier for the laser feature recognition, and then the robot directly circumvents the obstacle and follows the infrared guiding signal for docking. If the robot directly recognizes a position A of the charging station, and there is no other obstacle between the robot and the charging station, as shown in FIG. 4, then the docking position C on the map may be calculated according to the information of the laser ranging and the mathematical relationship of the triangle, further the robot moves to the docking position C and follows the infrared guiding signal for docking.

It should be noted that, if the docking position is determined, and if the position of the charging station is detected to be offset during the process of performing docking, then the docking process is exited, and the position of the charging station is re-determined, further the docking is restarted.

Compared with the prior art, the embodiments of the present application start the laser feature recognition under the condition that the distance to the charging station is determined less than the preset distance, and identify the charging station in the manner of the laser feature recognition, and then guide the robot to perform the docking process by combining the laser ranging signal and the infrared guiding signal, which enables the robot to accurately recognize the charging station due to the combination of various methods for identifying the charging station, and enables the robot to move to the identified charging station to perform the docking process. If there is a hollow obstacle, through the recognition method for the laser feature recognition, the robot can effectively avoid the collision due to that the robot misidentifies the charging station, which accelerates the speed of the robot to dock; at the same time, the robot, when at a close distance to the charging station, compensates the blind area of the infrared guiding signal through combination of the laser ranging signal and the infrared guiding signal. Further, when the obstacle (such as a wall) and the charging station are adjacent to each other, the robot avoids the problem of being fail to dock caused by its misidentification of the charging station through combination with the laser feature recognition. Therefore, the identification accuracy for the charging station is improved, which further speeds up the speed of the robot to dock.

Figure 5:
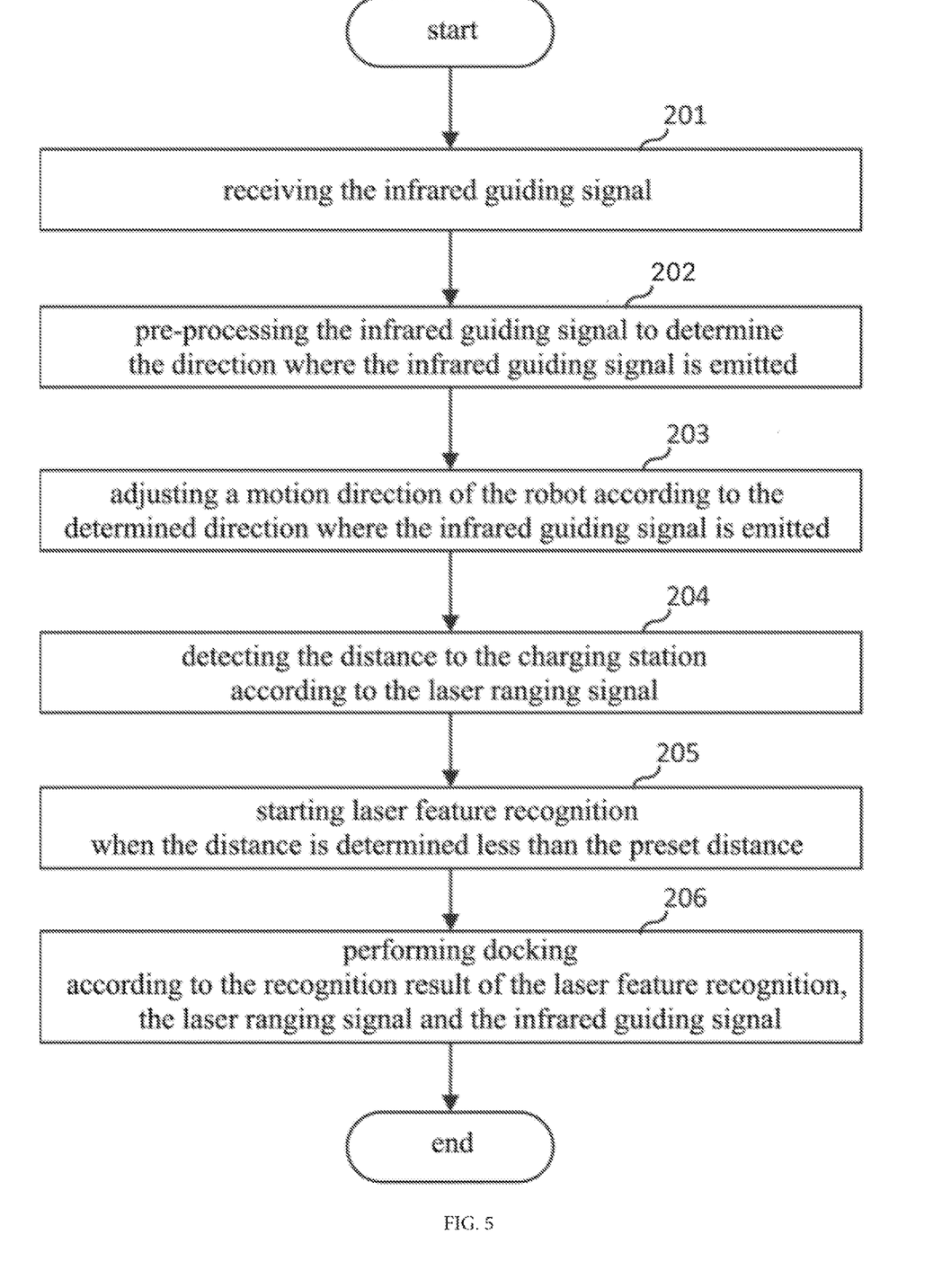
FIG. 5 is a specific schematic flowchart of the method for automatically charging a robot provided by a second embodiment according to the present application.

The second embodiment of the present application relates to a method for automatically charging a robot. The second embodiment is a further improvement of the first embodiment, and the main improvement is that, in the second embodiment of the present application, the infrared guiding signal is received before the step of detecting the distance to the charging station according to the laser ranging signal, and the direction of motion is adjusted according to the infrared guiding signal. The specific process is as shown in FIG. 5.

At the step 201: receiving the infrared guiding signal.

Specifically, when the robot detects that its own power reaches a lower power limit, the charging station emits the infrared guiding signal, and the robot receives the infrared guiding signal, and searches for the position of the charging station through the infrared guiding signal. It will be understood that, in order to receive the infrared guiding signal as much as possible, the robot is provided with a plurality of sensors for receiving the infrared guiding signal, such as 2, 4, and the like.

At the step 202: pre-processing the infrared guiding signal, and determining the direction where the infrared guiding signal is emitted.

Figure 6:
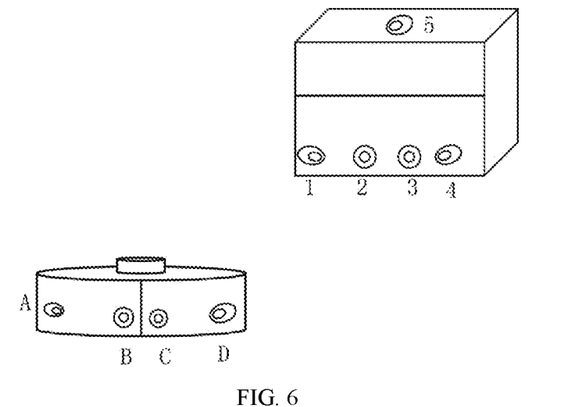
FIG. 6 is a schematic diagram of determining a direction where the infrared guiding signal is emitted according to the second embodiment of the present application.

Specifically, the infrared guiding signal is decoded, and the direction of emitting the infrared guiding signal is determined according to the intensity of the received infrared guiding signal. For example, as shown in FIG. 6, if the robot is provided with four sensors A, B, C, and D for receiving the infrared guiding signal, and the charging station is arranged with sensors for emitting infrared guiding signals respectively at positions 1, 2, 3, 4, and 5, then it may be determined that the direction of emitting the infrared guiding signal is the direction toward the position of the charging station 3 if the infrared guiding signal received by the sensor at point C is the strongest.

At the step 203: adjusting a motion direction of the robot according to the determined direction where the infrared guiding signal is emitted.

Specifically, the forward direction of the robot is adjusted to face the direction of emitting the infrared guiding signal. Adjusting the forward direction of the robot speeds up the process that the robot searches for the position of the charging station.

At the step 204: detecting the distance to the charging station according to the laser ranging signal.

Specifically, the laser ranging signal is emitted in the direction where the infrared guiding signal is emitted; and the distance to the charging station is detected according to the laser ranging signal. The probability of detecting the charging station may be increased by emitting the laser ranging signal only in the direction where the infrared guiding signal is emitted.

At the step 205: starting laser feature recognition when the distance is determined less than the preset distance, where the laser feature recognition is configured to identify the charging station.

At the step 206: performing docking according to the recognition result of the laser feature recognition, the laser ranging signal and the infrared guiding signal.

It should be noted that the steps from 204 to 206 in this embodiment are substantially the same as the steps from 101 to 103 in the first embodiment, details of which are not described herein again.

The steps of the above various methods are divided only for the sake of clear description, and may be combined into one step or split into multiple steps when implemented, and they are all within the protection scope of the present patent as long as same logical relationship is included. The algorithm or process, in which an insignificant modification is added or to which an insignificant design is introduced without changing the core design of the algorithm and process, is within the protection scope of the present patent.

Figure 7:
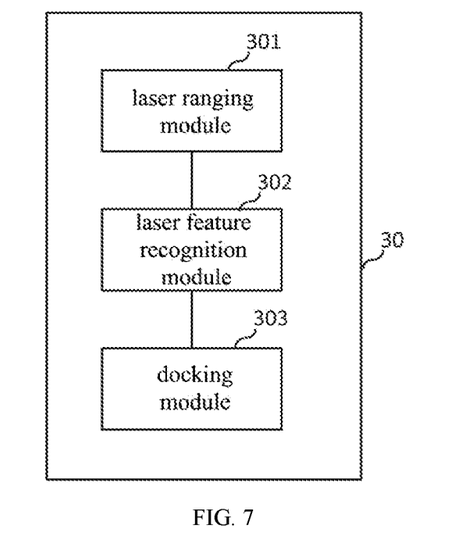
FIG. 7 is a structural schematic diagram of the device for automatically charging a robot according to a third embodiment of the present application.

The third embodiment of the present application relates to a device for automatically charging a robot, and the device for automatically charging a robot includes a laser ranging module 301, a laser feature recognition module 302 and an docking module 303. The specific structure of the device is as shown in FIG. 7.

The laser ranging module 301 is configured to detect the distance to a charging station according to a laser ranging signal; the laser feature recognition module 302 is configured to start laser feature recognition when the distance is less than a preset distance, where the laser feature recognition is configured to identify the charging station; and the docking module 303 is configured to perform docking process according to a recognition result of the laser feature recognition, the laser ranging signal and the infrared guiding signal.

It is not difficult to find that the present embodiment is an apparatus embodiment corresponding to the first embodiment, and the present embodiment can be implemented in cooperation with the first embodiment. The related technical details mentioned in the first embodiment are still effective in the present embodiment, and are not described herein again in order to reduce repetition. Accordingly, the related technical details mentioned in the present embodiment can also be applied to the first embodiment.

It is worth mentioning that each module involved in the present embodiment is a logic module. In practical applications, a logical unit may be implemented as a physical unit, a part of a physical unit, or combination of a plurality of physical units. In addition, in order to highlight the innovative part of the present application, a unit that is less closely related to solving the technical problem proposed by the present application is not introduced in the present embodiment, but this does not mean that there are no other units in the present embodiment.

Figure 8:
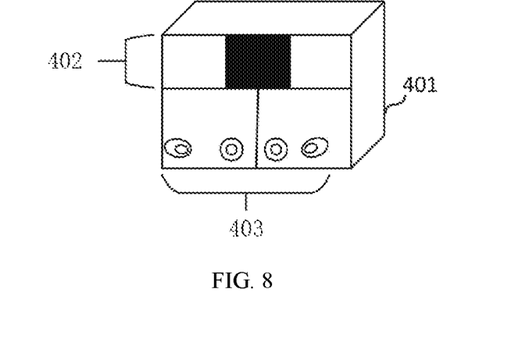
FIG. 8 is a structural schematic diagram of the charging station according to a fourth embodiment of the present application.

The fourth embodiment of the present application relates to a charging station. The charging station is configured to provide charging interface for a robot, and includes: a main body 401; and a laser-recognizable feature part 402, a component 403 for emitting an infrared guiding signal and a charging interface (not shown in FIG. 8) arranged on the main body 401. The specific structure is as shown in FIG. 8.

In a specific implementation, the laser-recognizable feature part 402 is configured to be recognized by a mode of laser feature recognition started by the robot; the component 403 for emitting an infrared guiding signal is configured to emit an infrared guidance signal to be received by the robot; and the charging interface is configured to charge the robot after the robot performs docking, where the robot performs docking according to the recognition result of the laser feature recognition, the laser ranging signal and the infrared guiding signal.

Specifically, the shape of the main body 401 of the charging station may be in a shape of cuboid or a cylinder, which is not limited by the present embodiment. In the present embodiment, a cuboid main body will be described as an example. The laser-recognizable feature part 402 is arranged on a front surface of the main body 401, and the laser-recognizable feature part 402 has different reflection intensity to the laser feature recognition signal. As shown in FIG. 8, the laser-recognizable feature part 402 may be arranged as a feature plate having black and white intervals. Of course, it is also possible to arrange the black portion in FIG. 8 to be a concave shape to increase the reflection intensity. The component 403 for emitting an infrared guiding signal does not overlap with the laser-recognizable feature part 402, as shown in FIG. 8, and may be arranged below the laser-recognizable feature part 402. The position of the charging interface may be adapted to the charging port of the robot, and the position of the charging interface is not redundantly described here.

Compared with the prior art, the present embodiment provides the laser-recognizable feature part and the component for emitting an infrared guiding signal on the charging station. The probability of correctly recognizing the charging station is increased through the laser-recognizable feature part, and when the charging station is far away from the robot, arranging the component for emitting an infrared guiding signal enables the robot to quickly find the position of the charging station according to the infrared guiding signal emitted by the charging station, thereby improving the probability that the charging station is correctly recognized.

The fifth embodiment of the present application relates to a charging station. The present embodiment is a further improvement of the fourth embodiment, and the main improvement is that, the specific positions of the laser-recognizable feature part and the component for emitting the infrared guiding signal is defined in the present embodiment. The specific structure is as shown in FIG. 9.

In a specific implementation, the height of the laser-recognizable feature part 402 in the region where the main body 401 is located is greater than the height of main body of the robot; the height of the component 403 for emitting the infrared guiding signal in the region where the main body 401 is located has the same height as the main body of the robot; the charging interface is arranged on a side of the main body 401 having the laser-recognizable feature part 402 and the structure 403 for emitting the infrared guiding signal.

Figure 9:
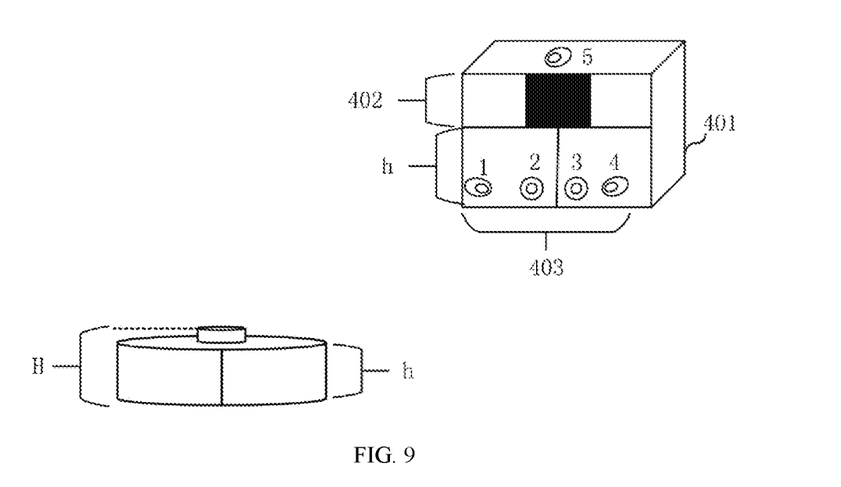
FIG. 9 is a structural schematic diagram of the charging station according to a fifth embodiment of the present application.
Figure 10:
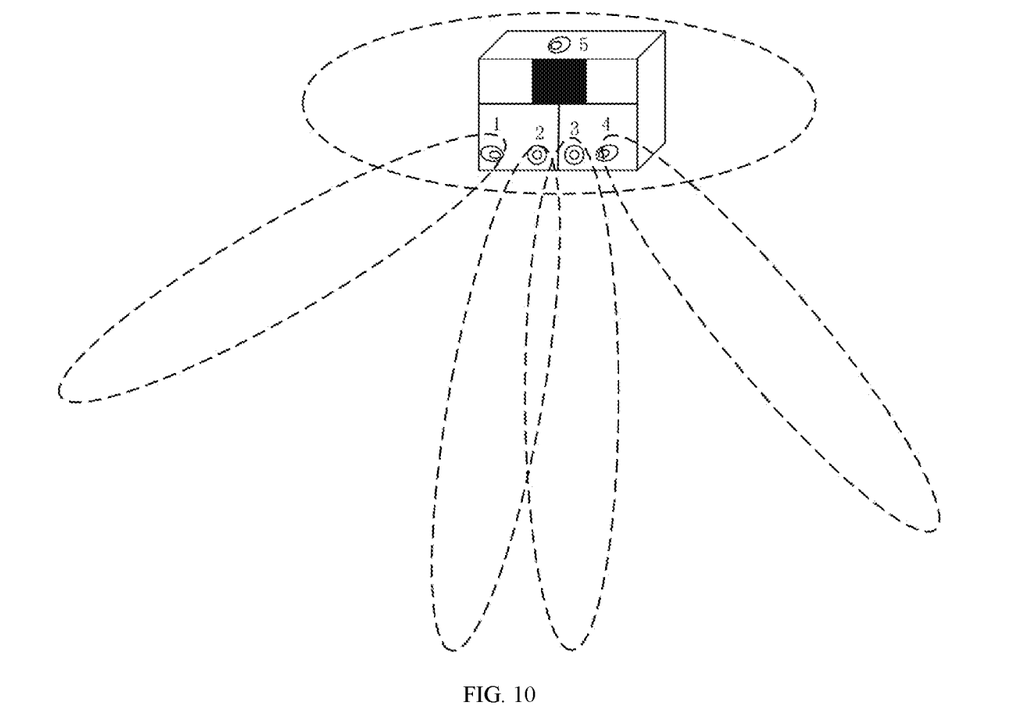
FIG. 10 is a schematic diagram showing a coverage range of the infrared guiding signal of the charging station according to a fifth embodiment of the present application

Specifically, as shown in FIG. 9, the height of the main body of the robot is h, the overall height of the robot is H, and the structure 403 for emitting the infrared guiding signal is arranged within a region, having a height h, of the body 401, and the laser-recognizable feature part 402 is arranged at a region having a height higher than h. Where, the structure 403 for emitting the infrared guiding signal includes at least four sensors for emitting infrared guiding signals, which are uniformly arranged in the region, having the height h, of the body 401. In the present embodiment, five sensors for emitting infrared guiding signals are used, which are respectively arranged at positions 1, 2, 3, 4, and 5 as shown in FIG. 9, where the positions 2 and 3 are respectively at two sides of an intermediate position of the main body 401, the position 5 is an intermediate position at the top of the main body 401. When the infrared guiding signal is emitted at the position 5, a near-field near-ground signal will be generated. FIG. 10 is a schematic diagram of the coverage range of the infrared guiding signal of the charging station, and the elliptical dotted lines in FIG. 9 are the coverage ranges of the generated infrared guiding signals.

In the charging station provided by the present embodiment, the laser-recognizable feature part and the component for emitting the infrared guiding signal are arranged according to the height of the robot, which improves the probability that the feature recognition structure is recognized by the robot, and improves the coverage range of the infrared guiding signals.

Figure 11:
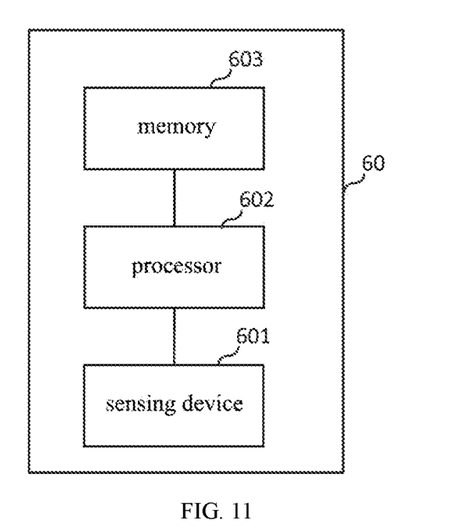
FIG. 11 is a structural schematic diagram of the robot according to a sixth embodiment of the present application.

The sixth embodiment of the present application relates to a robot. The robot includes a sensing device 601, at least one processor 602 and a memory 603 in communication connection with the at least one processor 602, where the sensing device 601 emits or receives signals under the control of the processor 602, the memory 603 is stored with instructions executable by the at least one processor 602, and the instructions, when executed by the at least one processor 602, enable the at least one processor 602 to perform the method of automatically charging a robot in the first embodiment or the second embodiment. The structure of the robot is as shown in FIG. 11.

Where, the memory and the processor are connected in a bus manner, and the bus may include any number of interconnected buses and bridges that link together, and the bus connects one or more processors with various circuits of the memory. The bus may also connect various other circuits, such as peripherals, voltage regulators, and power management circuits and the like, as is well known in the art and, therefore, will not be further described herein. The bus interface provides an interface between the bus and the transceiver. The transceiver may be a component or a plurality of components, such as a plurality of receivers and transmitters, which provides a unit for communicating with various other devices on a transmission medium. The data processed by the processor is transmitted over the wireless medium via an antenna. Further, the antenna also receives the data and transmits the data to the processor.

The processor is responsible for managing the bus and normal processing, as well as providing various functions including timing, peripheral interfaces, voltage regulation, power management and other control functions. The memory may be configured to store data used by the processor when performing operations.

Figure 12:
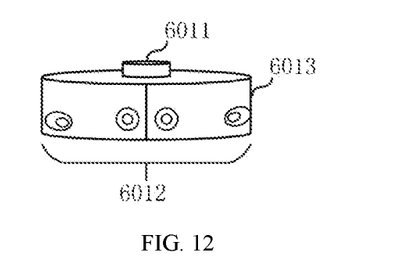
FIG. 12 is a structural schematic diagram of the robot according to a seventh embodiment of the present application.

The seventh embodiment of the present application relates to a robot. The present embodiment is a further improvement of the sixth embodiment, and the main improvement is that, the specific position of the sensing device is defined in the present embodiment. The specific structure is as shown in FIG. 12.

In a specific implementation, the sensing device includes a laser sensing device 6011 and a device 6012 for receiving an infrared guiding signal. The laser sensing device 6011 is arranged at the top of the main body 6013 of the robot, and includes at least one laser sensor and at least one laser emitter. The device 6012 for receiving an infrared guiding signal includes at least two sensors for receiving the infrared guiding signal, where the at least two sensors for receiving the infrared guiding signal are arranged at a front portion of the main body 6013 of the robot and at a side substantially perpendicular to the ground, and the front portion is a portion of the main body of the robot facing toward the direction in which the robot moves forward during the movement.

Specifically, the shape of the robot may be in a shape of cylinder or cuboid, which is not limited in the present embodiment. The present embodiment is described by taking a cylindrical robot as an example. In the present embodiment, the laser sensing device 6011 including a laser sensor and a laser emitter is taken as an example, and four devices for receiving infrared guiding signals are taken as an example to illustrate. As shown in FIG. 12, the laser sensing device 6011 is arranged at the top of the main body of the robot, the one laser emitter is connected to a motor, and the laser emitter rotates 360 degrees on the top of the main body of the robot by the motor, so as to emit a laser feature signal or a laser ranging signal, and the laser sensor receives the returned laser feature signal or the returned laser ranging signal. Where, the main body of the robot is indicated as 6013 in FIG. 12, and the devices 12 for receiving infrared guiding signals is arranged at the front portion. As shown in FIG. 12, there are at least four sensors for receiving infrared guiding signals arranged at the side of the front portion, and the positions of the sensors correspond to the positions of the sensors for emitting infrared guiding signals of the charging station.

The robot provided by the present embodiment increases the probability that the robot receives the infrared guiding signals by providing a plurality of sensors for receiving infrared guiding signals, and avoids occlusion of the laser signals by arranging the laser sensing device on the top of the main body of the robot.

Those of ordinary skill in the art will be understood that, the above embodiments are specific embodiments for implementing the present application, and various modifications may be made to these embodiments in the form and details without departing from the spirit and scope of the present application.

What is claimed is:

1. A method for automatically charging a robot, applied to the robot, comprising steps of:
   detecting a distance to a charging station according to a laser ranging signal;
   starting laser feature recognition when the distance is determined less than a preset distance, wherein the laser feature recognition is configured to identify the charging station; and
   performing a docking process according to a recognition result of the laser feature recognition, the laser ranging signal and an infrared guiding signal;
   wherein the step of performing the docking process according to the recognition result of the laser feature recognition, the laser ranging signal and the infrared guiding signal specifically comprises steps of:
   acquiring the recognition result of performing the laser feature recognition on a collision object when there is a collision;
   outputting an error message, if the collision object is determined to be the charging station according to the recognition result and if a current collision frequency exceeds a preset collision frequency;
   performing the docking process by following the infrared guiding signal, if the collision object is determined to be the charging station according to the recognition result and if the current collision frequency does not exceed the preset collision frequency;
   determining a motion path according to position information of the charging station, reaching the position of the charging station according to the motion path, and performing the docking process by following the infrared guiding signal, if the collision object is determined to be an obstacle according to the recognition result and if it is detected that the robot is stored with the position information of the charging station; and
   performing the docking process by following the infrared guiding signal when it is determined that the obstacle has been circumvented or outputting an error message when it is determined that the obstacle has not been circumvented, if the collision object is determined to be an obstacle according to the recognition result and if it is detected that the robot is not stored with the position information of the charging station.

2. The method according to claim 1, wherein, the step of starting laser feature recognition when the distance is determined to be less than the preset distance specifically comprises steps of:
   detecting whether a collision has occurred when the distance is determined less than the preset distance;
   starting the laser feature recognition if it is determined that there is no collision, and performing the laser feature recognition in a direction where the infrared guiding signal is emitted; and
   starting the laser feature recognition if it is determined that there is a collision, and performing the laser feature recognition on the collision object.

3. The method according to claim 2, wherein, before the step of detecting the distance to the charging station according to the laser ranging signal, the method further comprises steps of:
   receiving the infrared guiding signal;
   pre-processing the infrared guiding signal to determine the direction where the infrared guiding signal is emitted; and
   adjusting a motion direction of the robot according to the determined direction where the infrared guiding signal is emitted.

4. The method according to claim 1, wherein, the step of performing the docking process according to the recognition result of the laser feature recognition, the laser ranging signal and the infrared guiding signal specifically comprises steps of:
   acquiring the recognition result of performing the laser feature recognition in a direction where the infrared guiding signal is emitted when there is no collision;

circumventing the obstacle and performing the docking process by following the infrared guiding signal if an obstacle is detected in the direction where the infrared guiding signal is emitted according to the recognition result;

detecting the distance between the current position and the charging station if the charging station is detected in the direction where the infrared guiding signal is emitted according to the recognition result;

determining a docking position according to the currently determined distance, and moving to the docking position; and performing docking by following the infrared guiding signal at the docking position.

5. The method according to claim 4, wherein, before the step of detecting the distance to the charging station according to the laser ranging signal, the method further comprises steps of:

receiving the infrared guiding signal;

pre-processing the infrared guiding signal to determine the direction where the infrared guiding signal is emitted; and adjusting a motion direction of the robot according to the determined direction where the infrared guiding signal is emitted.

6. The method according to claim 1, wherein, before the step of detecting the distance to the charging station according to the laser ranging signal, the method further comprises steps of:

receiving the infrared guiding signal;

pre-processing the infrared guiding signal, and determining the direction where the infrared guiding signal is emitted; and adjusting a motion direction of the robot according to the determined direction where the infrared guiding signal is emitted.

7. The method according to claim 6, wherein, the step of detecting the distance to the charging station according to the laser ranging signal specifically comprises steps of:

emitting the laser ranging signal in the direction where the infrared guiding signal is emitted; and detecting the distance to the charging station according to the laser ranging signal.

8. The method according to claim 1, wherein, the method is implemented through a laser ranging module, a laser feature recognition module and a docking module;

wherein, the laser ranging module is configured to detect the distance to the charging station according to the laser ranging signal;

the laser feature recognition module is configured to start the laser feature recognition when the distance is determined less than the preset distance; and the docking module is configured to perform the docking process according to a recognition result of the laser feature recognition, the laser ranging signal and the infrared guiding signal.

9. The method according to claim 8, wherein, before the step of detecting the distance to the charging station according to the laser ranging signal, the method further comprises steps of:

receiving the infrared guiding signal;

pre-processing the infrared guiding signal to determine the direction where the infrared guiding signal is emitted; and adjusting a motion direction of the robot according to the determined direction where the infrared guiding signal is emitted.

10. A robot, comprising:

a sensing device;

at least one processor; and a memory in communication connection with the at least one processor;

wherein, the sensing device is configured to emit or receive a signal under control of the processor; and the memory is stored with instructions executable by the at least one processor, wherein the instructions, when executed by the at least one processor, enable the at least one processor to perform steps of:

detecting a distance to a charging station according to a laser ranging signal;

starting laser feature recognition when the distance is determined less than a preset distance, wherein the laser feature recognition is configured to identify the charging station; and performing a docking process according to a recognition result of the laser feature recognition, the laser ranging signal and an infrared guiding signal;

wherein the step, performed by the at least one processor, of performing the docking process according to the recognition result of the laser feature recognition, the laser ranging signal and the infrared guiding signal specifically comprises steps of:

acquiring the recognition result of performing the laser feature recognition on a collision object when there is a collision;

outputting an error message, if the collision object is determined to be the charging station according to the recognition result and if a current collision frequency exceeds a preset collision frequency;

performing the docking process by following the infrared guiding signal, if the collision object is determined to be the charging station according to the recognition result and if the current collision frequency does not exceed the preset collision frequency;

determining a motion path according to position information of the charging station, reaching the position of the charging station according to the motion path, and performing the docking process by following the infrared guiding signal, if the collision object is determined to be an obstacle according to the recognition result and if it is detected that the robot is stored with the position information of the charging station; and performing the docking process by following the infrared guiding signal when it is determined that the obstacle has been circumvented or outputting an error message when it is determined that the obstacle has not been circumvented, if the collision object is determined to be an obstacle according to the recognition result and if it is detected that the robot is not stored with the position information of the charging station.

11. The robot according to claim 10, wherein, the sensing device comprises:

a laser sensing device; and a device for receiving the infrared guiding signal;

wherein, the laser sensing device is arranged at top of a main body of the robot, and comprises at least one laser sensor and at least one laser emitter; and the device for receiving the infrared guiding signal comprises at least two sensors for receiving the infrared guiding signal, wherein the at least two sensors for receiving the infrared guiding signal are arranged at a front portion of the main body of the robot and at a side substantially perpendicular to ground, and the front portion is a portion of the main body of the robot facing toward the direction where the robot moves forward during the movement.

12. The robot according to claim 10, wherein, the step, performed by the at least one processor, of starting laser feature recognition when the distance is determined less than the preset distance specifically comprises the steps of:
detecting whether a collision has occurred when the distance is determined less than the preset distance;
starting the laser feature recognition if it is determined that there is no collision, and performing the laser feature recognition in a direction where the infrared guiding signal is emitted; and
starting the laser feature recognition if it is determined that there is a collision, and performing the laser feature recognition on the collision object.

13. The robot according to claim 10, wherein, the step, performed by the at least one processor, of performing the docking process according to the recognition result of the laser feature recognition, the laser ranging signal and the infrared guiding signal specifically comprises steps of:
acquiring the recognition result of performing the laser feature recognition in a direction where the infrared guiding signal is emitted when there is no collision;
circumventing the obstacle and performing the docking process by following the infrared guiding signal if an obstacle is detected in the direction where the infrared guiding signal is emitted according to the recognition result;
detecting the distance between the current position and the charging station if the charging station is detected in the direction where the infrared guiding signal is emitted according to the recognition result;
determining a docking position according to the currently determined distance, and moving to the docking position; and
performing docking by following the infrared guiding signal at the docking position.

14. The robot according to claim 10, wherein, before the step of detecting the distance to the charging station according to the laser ranging signal, the at least one processor further performs steps of:
receiving the infrared guiding signal;
pre-processing the infrared guiding signal to determine the direction where the infrared guiding signal is emitted; and
adjusting a motion direction of the robot according to the determined direction where the infrared guiding signal is emitted.

15. The robot according to claim 14, wherein, the step, performed by the at least one processor, of detecting the distance to the charging station according to the laser ranging signal specifically comprises steps of:
emitting the laser ranging signal in the direction where the infrared guiding signal is emitted; and
detecting the distance to the charging station according to the laser ranging signal.

* * * * *